(12) United States Patent
Szilagyi

(10) Patent No.: US 11,843,522 B2
(45) Date of Patent: Dec. 12, 2023

(54) MACHINE LEARNING MODEL CERTIFICATION

(71) Applicant: Nokia Technologies Oy, Espoo (FI)

(72) Inventor: Peter Szilagyi, Budapest (HU)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/006,954

(22) PCT Filed: Jul. 30, 2020

(86) PCT No.: PCT/US2020/044249
§ 371 (c)(1),
(2) Date: Jan. 26, 2023

(87) PCT Pub. No.: WO2022/025898
PCT Pub. Date: Feb. 3, 2022

(65) Prior Publication Data
US 2023/0269144 A1    Aug. 24, 2023

(51) Int. Cl.
*H04L 41/5009* (2022.01)
*G06N 5/045* (2023.01)
*G06N 5/01* (2023.01)
*G06N 5/04* (2023.01)

(52) U.S. Cl.
CPC ............ *H04L 41/5009* (2013.01); *G06N 5/01* (2023.01); *G06N 5/04* (2013.01); *G06N 5/045* (2013.01)

(58) Field of Classification Search
CPC .......... G06N 5/04; G06N 20/00; G06N 5/045; G06N 5/01; G06N 5/025; G06F 18/24323; G06Q 10/10
See application file for complete search history.

(56) References Cited

U.S. PATENT DOCUMENTS

| | | | |
|---|---|---|---|
| 9,300,552 B2 | 3/2016 | Dube et al. | |
| 9,344,380 B2 | 5/2016 | Zhu et al. | |
| 11,501,210 B1* | 11/2022 | Zhdanov | G06N 5/04 |
| 2019/0188605 A1* | 6/2019 | Zavesky | G06N 20/00 |
| 2021/0133515 A1* | 5/2021 | Biswas | G06N 5/045 |
| 2021/0142782 A1* | 5/2021 | Wolf | G10L 13/08 |
| 2021/0326746 A1* | 10/2021 | Dayama | G06N 20/00 |
| 2022/0019663 A1* | 1/2022 | Stapleton | H04L 9/008 |

(Continued)

OTHER PUBLICATIONS

Ciavaglia, "Closed-Loop Automation Advanced Topics", ZSM Association Forum, ETSI ZSM009-3, Sep. 17, 2020, pp. 1-11.

(Continued)

*Primary Examiner* — Mahran Y Abu Roumi
(74) *Attorney, Agent, or Firm* — Nokia Technologies Oy

(57) ABSTRACT

A method and system for verifying the results from a machine learning (ML) model hosted by a machine learning as a service (MLaaS) for a MLaaS consumer (MLC), including: receiving a request for benchmark samples from a MLC for the ML model; generating one-time use benchmark samples and benchmark outputs for the ML model; transmitting the benchmark samples to the MLC; receiving from the MLC outputs from the ML model on the benchmark samples; comparing the MLC outputs on the benchmark samples with the generated benchmark outputs to verify the ML model outputs; and sending a verification message to the MLC based on verification.

19 Claims, 5 Drawing Sheets

(56) References Cited

U.S. PATENT DOCUMENTS

2022/0022066 A1* 1/2022 Anand Pushkala ... H04L 41/145
2023/0067026 A1* 3/2023 Huts .................... G06V 20/00

OTHER PUBLICATIONS

"Zero-touch network and Service Management (ZSM); Reference Architecture", ETSI GS ZSM 002, V1.1.1, Aug. 2019, pp. 1-80.

"Machine Learning on Encrypted Data: No Longer a Fantasy", Medium, Retrieved on Feb. 7, 2023, Webpage available at : https://medium.com/intuit-engineering/machine-learning-on-encrypted-data-no-longer-a-fantasy-58e37e9f31d7.

"Machine Learning on Encrypted Data Without Decrypting It", Julia Hub, Retrieved on Feb. 7, 2023, Webpage available at : https://juliahub.com/blog/2019/11/encrypted-machine-learning/.

International Search Report and Written Opinion received for corresponding Patent Cooperation Treaty Application No. PCT/US2020/044249, dated Oct. 16, 2020, 10 pages.

Halpern et al., "One Size Does Not Fit All: Quantifying and Exposing the Accuracy-Latency Trade-off in Machine Learning Cloud Service APIs via Tolerance Tiers", IEEE International Symposium on Performance Analysis of Systems and Software (ISPASS), 2019, 14 pages.

Kliegr et al., "Advances in Machine Learning for the Behavioral Sciences", arXiv, Nov. 8, 2019, pp. 1-41.

Yao, "Empirical Analysis of Machine Learning as a Service", Thesis, May 2019, 50 pages.

\* cited by examiner

023
MACHINE LEARNING MODEL CERTIFICATION

RELATED APPLICATION

This application was originally filed as PCT Application No. PCT/US2020/044249, filed on Jul. 30, 2020, of which is incorporated herein by reference in its entirety.

TECHNICAL FIELD

Various exemplary embodiments disclosed herein relate generally to a system and method for machine learning model certification.

BACKGROUND

Machine Learning (ML) as a service (MLaaS) is a service model where an MLaaS Provider (MLP) encapsulates ML models to implement use cases that are accessible to MLaaS Consumers (MLC) through an interface (e.g., a REST API). MLaaS is already popular among public cloud and analytics providers, such as Azure (providing, e.g., speech-to-text API, image analysis API, etc.).

In practice, the MLP may have multiple models trained for the same ML use case. Different models may solve the same task with different accuracy (e.g., 90%, 95%, 99%). The total cost of ownership (TCO) of a more accurate model is usually higher than that of a less accurate one due to a more data and compute intensive training process, larger model size, and more compute resources needed for executing the trained model for inference. The TCO may be reflected in the MLP's charging model: the MLP may charge the MLC per API calls or by the amount of processed data, and vary the price based on the requested accuracy level because of the increase in resources consumed by more accurate models.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method for verifying the results from a machine learning (ML) model hosted by a machine learning as a service (MLaaS) for a MLaaS consumer (MLC), including: receiving a request for benchmark samples from a MLC for the ML model; generating one-time use benchmark samples and benchmark outputs for the ML model; transmitting the benchmark samples to the MLC; receiving from the MLC outputs from the ML model on the benchmark samples; comparing the MLC outputs on the benchmark samples with the generated benchmark outputs to verify the ML model outputs; and sending a verification message to the MLC based on verification. Various embodiments are described, wherein generating benchmark samples and outputs for the ML model includes using a simulation driven by a random source.

Various embodiments are described, wherein the simulation is a machine learning based simulation.

Various embodiments are described, wherein receiving a request for benchmark samples from a MLC for the ML model includes receiving MLC inputs to the ML model, and generating benchmark samples and outputs for the ML model includes using a simulation and the MLC inputs to the ML model.

Various embodiments are described, further comprising publishing the generated benchmark samples and the outputs from the ML model on the benchmark samples.

Further various embodiments relate to a method for verifying the results from a machine learning (ML) model hosted by a machine learning as a service (MLaaS) using a ML certification server (MLCS), including: sending a request for one-time use benchmark samples from the MLCS for the ML model; receiving the benchmark samples from the MLCS; mixing input data for the ML model with the received benchmark samples; sending the mixed input data and received benchmark samples to the ML model; receiving the outputs from the ML model in response to the mixed input data and received benchmark samples; requesting verification from the MLCS of the outputs of the ML model based upon the benchmark samples; and receiving verification of the ML outputs from the MLCS.

Various embodiments are described, wherein mixing input data for the ML model with the received benchmark samples includes concatenating the input data for the ML model with the received benchmark samples and then randomly shuffling the order of the concatenated inputs.

Various embodiments are described, wherein mixing input data for the ML model with the received benchmark samples includes combining each of the input data for the ML model with different receive benchmark samples.

Various embodiments are described, wherein the input samples are one of images, audio data, text data, and numerical data.

Various embodiments are described, further comprising separating the outputs for the ML based upon the benchmark samples form the outputs of the ML model based upon the input data.

Further various embodiments relate to a method for verifying the results from a machine learning (ML) model hosted by a machine learning as a service (MLaaS) for a MLaaS consumer (MLC), including: receiving a request from a MLC to run input data from the MLC on the ML model; generating one-time use benchmark samples and benchmark outputs for the ML model; mixing the received input data with the generated benchmark samples; sending the mixed input data and benchmark samples to the ML model; receiving the outputs from the ML model in response to the mixed input data and benchmark samples; comparing the MLC outputs on the benchmark samples with the generated benchmark outputs to verify the ML model outputs; and sending a verification message to the MLC based on verification.

Various embodiments are described, wherein generating benchmark samples and outputs for the ML model includes using a simulation driven by a random source.

Various embodiments are described, wherein the simulation is a machine learning based simulation.

Various embodiments are described, wherein generating benchmark samples and outputs for the ML model includes using a simulation and the input data to the ML model.

Various embodiments are described, further comprising publishing the generated benchmark samples and the outputs from the ML model on the benchmark samples.

Various embodiments are described, wherein mixing the received input data with the generated benchmark samples includes concatenating the received input data with the generated benchmark samples and then randomly shuffling the order of the concatenated inputs.

Various embodiments are described, wherein mixing the received input data with the generated benchmark samples includes combining each of the received input data with different receive benchmark samples.

Various embodiments are described, wherein the input samples are one of images, audio data, text data, and numerical data.

Various embodiments are described, wherein further comprising separating the outputs for the ML based upon the benchmark samples form the outputs of the ML model based upon the input data.

Further various embodiments relate to a method for certifying accuracy of a machine learning (ML) model hosted by a machine learning as a service (MLaaS), including: generating one-time use benchmark samples and benchmark outputs for the ML model; transmitting the benchmark samples to the ML model; receiving outputs from the ML model on the benchmark samples; comparing the ML outputs on the benchmark samples with the generated benchmark outputs; computing the accuracy of the ML model based upon the comparison of the ML outputs on the benchmark samples with the generated benchmark outputs; and publishing a certificate indicating the accuracy of the ML model.

Various embodiments are described, wherein generating one-time use benchmark samples and benchmark outputs for the ML model includes using a simulation driven by a random source.

Various embodiments are described, wherein the simulation is a machine learning based simulation.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
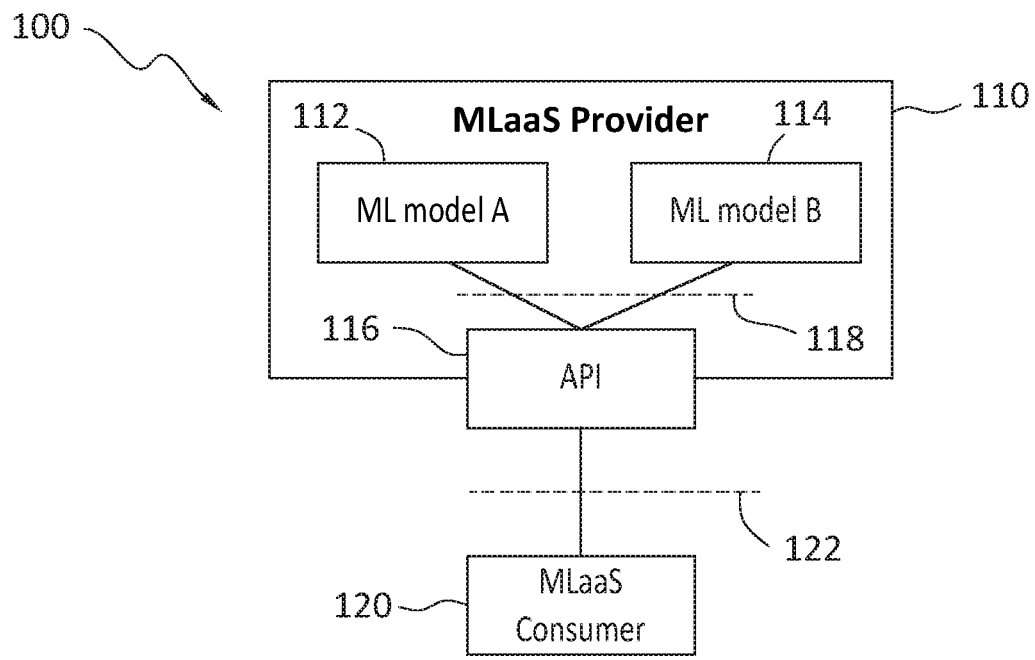
FIG. 1 illustrates a system where a MLaaS provider (MLP) provides ML services to a MLaaS consumer (MLC)

FIG. 1 illustrates a system where a MLaaS provider (MLP) 110 provides ML services to a MLaaS consumer (MLC) 120. The MLP 110 hosts a number of ML models including ML model A 112 and ML model B 114, but many other models may be available as well. The MLP 110 provides an application programming interface (API) 116 that allows the MLC 120 to gain access to the ML models 112, 114. The API is a public API that is exposed to the MLC 120 as shown by 122. The internal operation and ML models of the of the MLP 110 are hidden 118 from the MLC 120 by the API 116. The MLC 120 uses the API 116 to request specific services and provides the needed input via the API 116 and also receives back output data from the MLP 110 via the API 116.

A ML certification server (MLCS) is disclosed herein. The MLCS solves the problem of how to ensure that the ML model 112, 114 behind the MLaaS API 116 is accurate, e.g., according to a public statement of the MLP 110 on its own model accuracy or according to the accuracy selected by the MLC 120 via the API 116 or for which the MLC 120 is eligible via its subscription. The ML models are trained, hosted, and executed by the MLP 110 privately (i.e., the ML models cannot be accessed and studied by the MLC 120 or any other entity). When an MLC 120 submits its data to the MLP 110 for analysis, the MLC 120 receives the result of the model execution that bears no trace of the identity or any other attribute of the ML model that was used to process the data. When using the MLP 110, there is no proof for the MLC 120 that its data has been processed by an ML model with the agreed accuracy. The MLC 120 cannot obtain such proof on its own, for two reasons.

First, the amount of an MLC's data may be too low for statistically relevant benchmarking. For example, by submitting 10 samples for an ML model, and benchmarking the model's accuracy by evaluating the number of samples for which the model provided a good response, the error of benchmark accuracy is +/−10% (a single sample output being right/wrong causes 1/10=10% difference). Additionally, model benchmarking on 10 samples is not statistically significant; even for ML models that are generally highly accurate, one could find particular data samples on which the model does not perform well—but that does not mean the model as such is poor.

Second, the MLC 120 usually cannot validate the correctness of the MPL's results even on a single data sample, as that capability would require the MLC 120 to independently solve the ML use case delegated to the MLP 110. If the MLC 120 could solve the ML task itself, there would be no reason to use the MLP 110 in the first place. Therefore, the MLC 120 would need to trust the MLP 110 on the accuracy of the ML results, with no formal or experimental proof.

Another related technical problem arises for the MLP 110. How can the MLP 110 prove, without exposing its ML model publicly, that an MLC's data was indeed processed by an accurate ML model? For example, a malicious MLC 120 may deliberately submit low quality input data to the MLP 110 and complain that the results are poor (below the agreed accuracy) whereas in fact the data was simply not fit for the model.

The MLCS disclosed herein seeks to overcome these problems. An example use case is when a service provider wants to provide ML services to its clients, but does not have the expertise to do so, does not want to commit the resources to develop and maintain such ML services, or does not have sufficient requests for ML services to justify developing its own ML services.

The MLCS includes a method and apparatus that: (1) enables certification of the accuracy of an ML model accessed through an MLP interface; (2) enables MLC to obtain proof that their data were processed by a ML model with certified accuracy; and (3) enables the MLP to prove that it has processed an MLC's data with a certified ML model. During this process, the ML models remain secret to the MLP. The MLCS is applicable to existing MLPs (e.g., in public clouds) without any change to their current interface; also, the method does not require cooperation from the MLP or any additional service beyond what the MLP already provides to the MLC as part of its own business.

Figure 2:
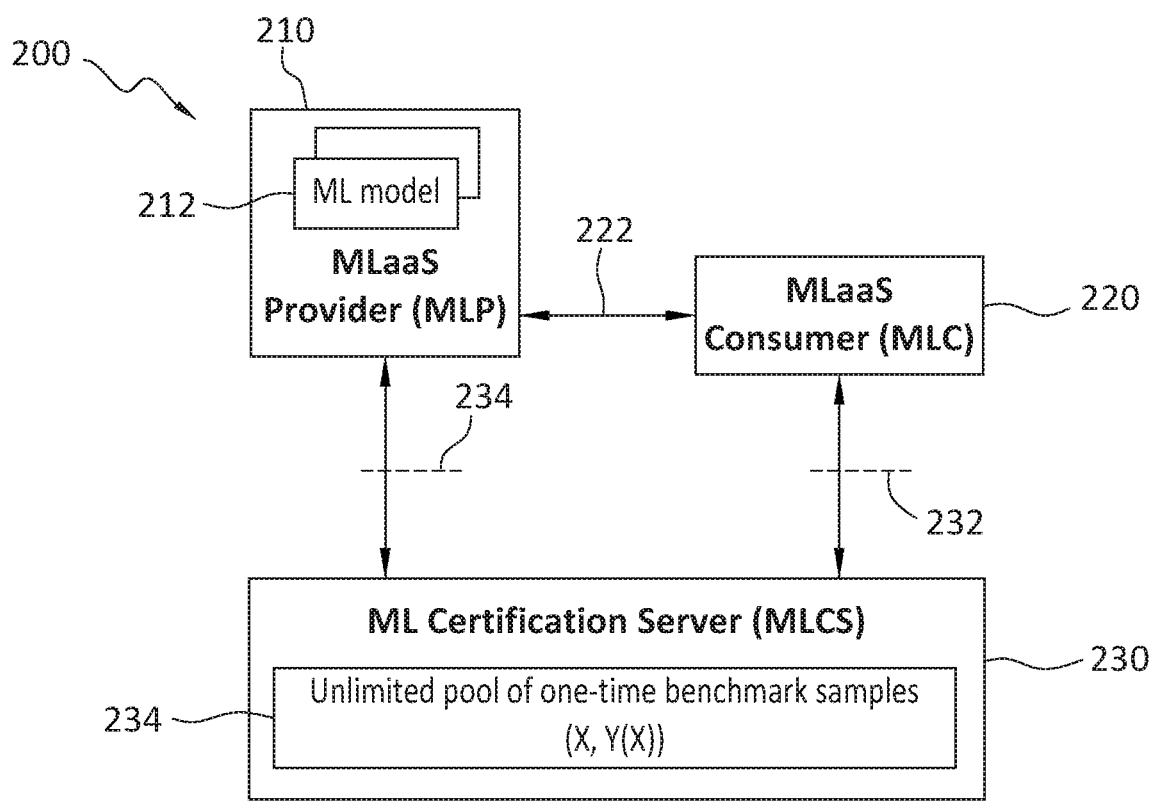
FIG. 2 illustrates a block diagram illustrating the interaction of the MLCS with the MLC and the MLP.

FIG. 2 illustrates a block diagram illustrating the interaction of the MLCS 230 with the MLC 220 and the MLP 210. The MLCS 230 may generate an unlimited number of data samples (X, Y(X)) where X is an input data suitable to be processed by an MLP's ML model 212 and Y(X) is the expected result when X is input into the ML model 212. The data samples X need to be syntactically and semantically correct to be processed by the ML model 212 offered by the MLP 230. Therefore, the MLCS 230 generates (X, Y(X)) data samples for each different ML model 212 to be benchmarked. The data samples generated (X, Y(X)) by the MLCS 230 are one-time samples 234, that is, they are never recycled or used more than once, ever. Thus, any entity that acquires an (X, Y(X)) data sample is not able to use it to imitate an ML model's expected operation by simply returning Y(X) for an input X, because the same X will never be encountered as input to the ML model 212 again. Also the MLCS 230 is able to generate as many unique benchmark samples as needed.

Figure 3:
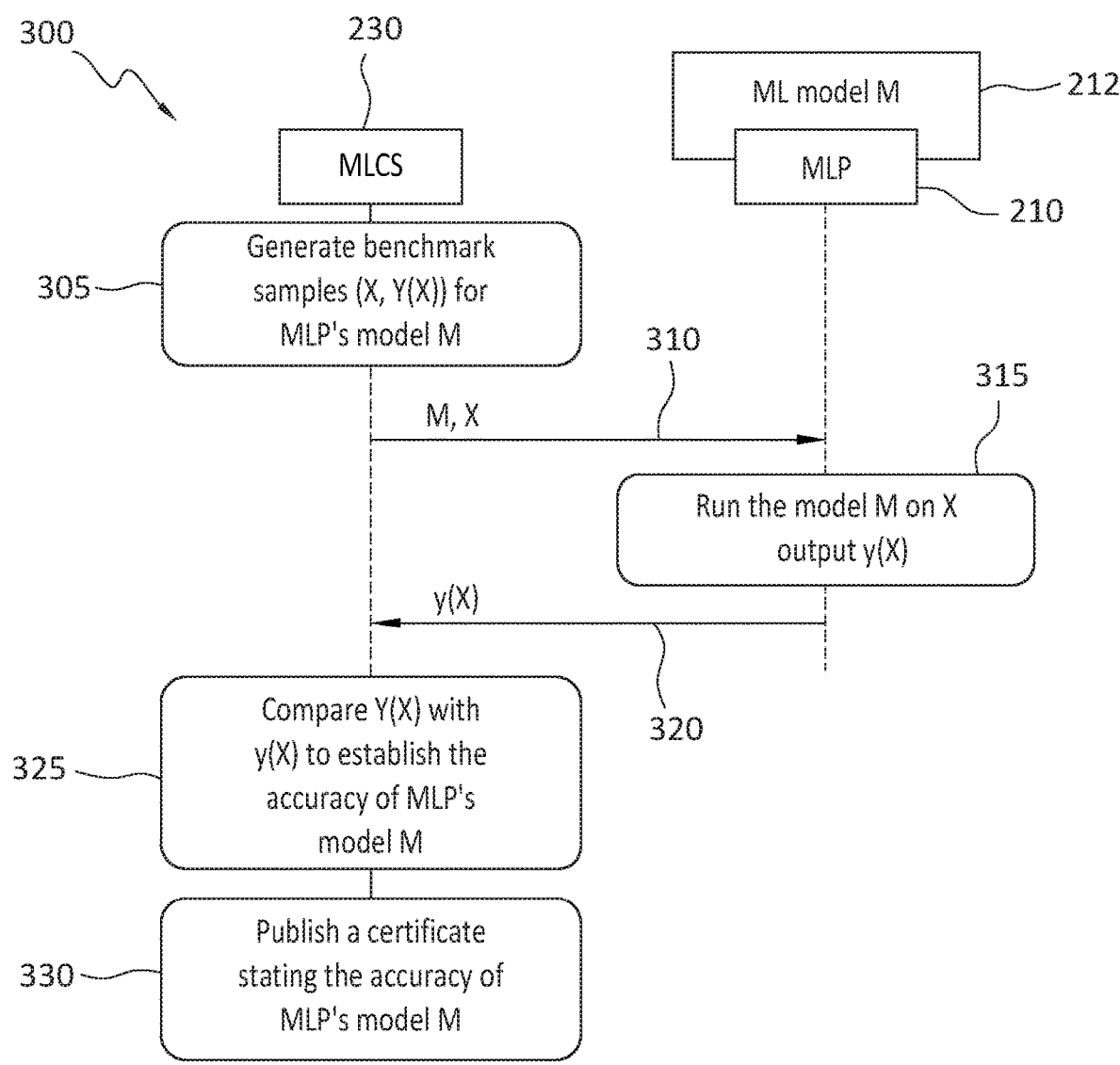
FIG. 3 is a flow diagram illustrating a method for the benchmarking of ML model in the MLP by the MLCS.

FIG. 3 is a flow diagram illustrating a method for the benchmarking of the ML model 212 in the MLP 210 by the MLCS 230. The MLCS 230 may benchmark and verify the accuracy of an MLP's ML model M by acting as an MLC, subscribing to the MLP's model M 212, and generating (X, Y(X)) samples fit to be processed by model M 305. The MLCS sends the X part of the data samples to the MLP 210 and specifies that model M is to be used 310. The MLCS 230 keeps the Y(X) part secret. The MLP 212 processes X 315 with ML model M 212; however, the processing step 315 is hidden inside the MLP 210. The MLP 210 only returns y(X) results in response to inputs X 320. The MLCS 230 compares the returned y(X) with the secret Y(X) to measure how accurately the MLP 210 was able to produce the expected output Y(X) for input X 325. The MLCS 230 may publish a public certificate stating that the MLP's ML model M has a certain accuracy 330.

Figure 4:
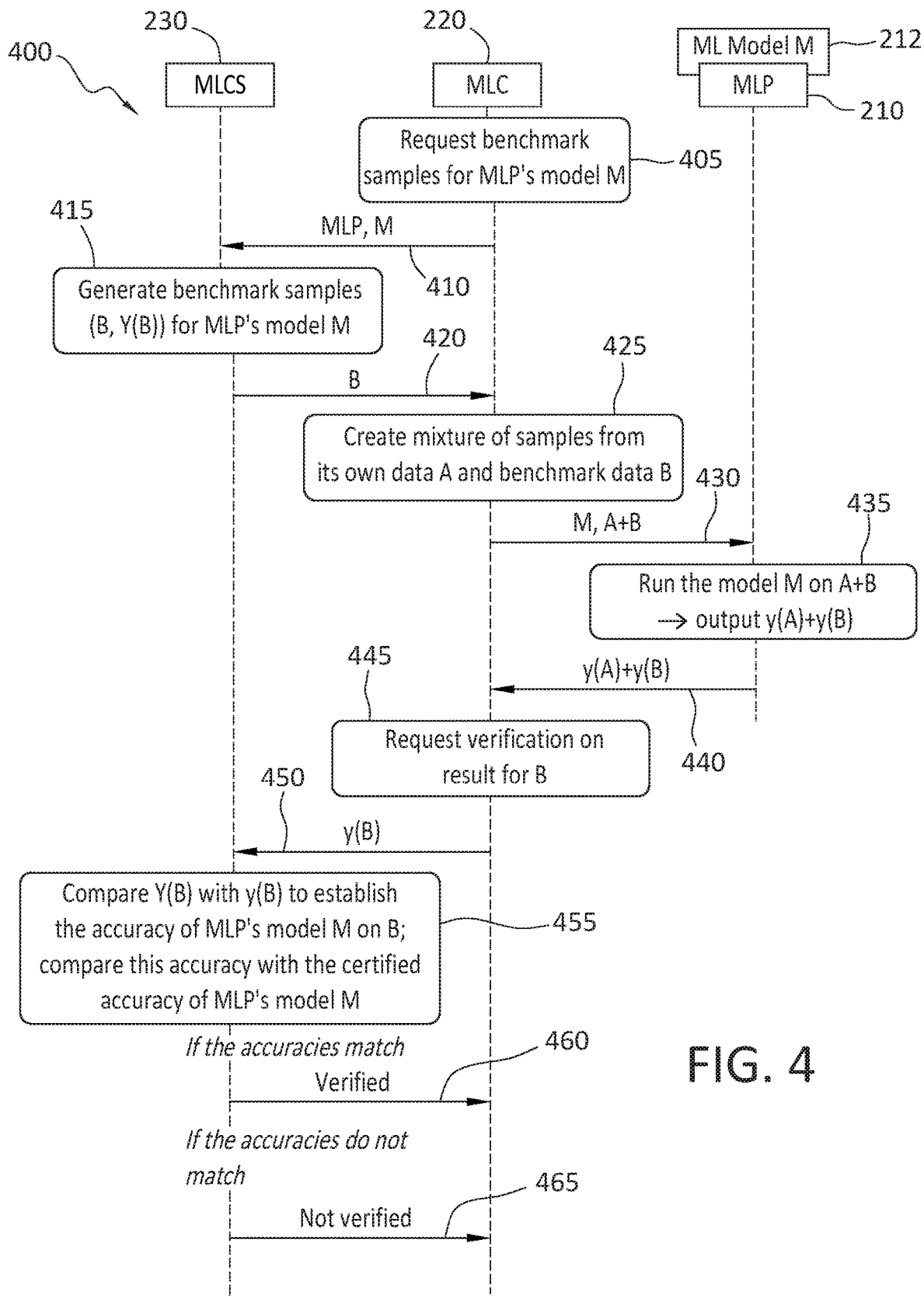
FIG. 4 illustrates a method of verifying that data samples from a MLC were accurately processed.

FIG. 4 illustrates a method of verifying that data samples from a MLC 220 were accurately processed. The MLCS 230 may verify that the data samples of an MLC 220 (other than the MLCS itself) were also processed by an ML model M 212 of the MLP 210 with the same accuracy level for the MLP's model M 212 as certified by the MLCS 230. The MLC 220 has its own data A that it would like to submit to MLP to be processed by model M 212. The MLC 220 does not know the expected output Y(A) for its data A, and neither does the MLCS 230. The MLC 220 generates and sends 405 a request 410 to the MLCS 230 to provide one-time benchmark samples compatible with the ML model M 212 of MLP 210. The MLCS 230 generates new one-time benchmark samples (B, Y(B)) 415 and provides part B of the samples 420 to the MLC 220 but keeps Y(B) as a secret to itself. Next, the MLP 210 mixes 425 its own data A with the one-time benchmark samples B obtained from MLCS 230 and sends the A+B mixture along with an indication of model M 430 to the MLP 210 for processing.

The MLP 210 runs the ML model M 212 on A+B 435 to produce the output y(A)+y(B) and returns the output y(A)+y(B) 440 to the MLC 220. The MLC 220 requests verification of the results 445 by forwarding the y(B) to the MLCS 230 for verification 450. The MLCS 230 using the Y(B) calculates the accuracy 455 of model M 212 on the one-time benchmark data B and the y(B) from the ML model M 212 and compares the calculated accuracy to the accuracy established during a previous certification. If the current accuracy matches the certified accuracy, the benchmark data B was very likely processed with model M 212 at the MLP 210. Because the MLP 210 had to process the mixture of A+B, performing well on part B implicitly proves that the same model M 212 was applied to data part A as well. The MLCS 230 sends this positive verification 460 to the MLC 220. If the two accuracies do not match, the MLCS 230 sends a negative indication 465 to the MLC 220. Therefore, by using the service of the MLCS 230, the MLC 220 obtains proof whether or not its own data was processed by a proper model of the MLP 210.

The following are considerations regarding potential attacks when using the MLCS to verify the accuracy of a ML model provided by the MLP. The strength of the MLCS method does not depend on whether the MLP knows that it is being benchmarked or that it is totally ignorant of the entire MLCS presence. Theoretically, it is possible that the MLP cleverly separates the A+B data into part A and B based upon some difference between the A and B data and then runs a good model on part B and a poor model on part A. However, such tinkering is very risky as the MLP may incorrectly guess which part of the input data is part A and part B, in which case the MLCS would detect the issue and red flag the MLP, causing a serious loss of reputation and business for the MLP. Additionally, because even a cleverly cheating MLP has to process part B using a good model, simply ensuring that the amount of data in part B is at least in the same order of magnitude as data in part A reduces the MLP's potential saving of computation power by processing part A with an inferior model. In practice, often the MLC's own data (part A) may be much smaller in size than what is needed for the benchmarking process to be statistically significant, that is, the size of part B may even be an order of magnitude higher the size of part A. Therefore, there is really no cost incentive for the MLP to try separate the mixture of data and process the parts separately, whereas there is a large loss in reputation at stake if even a single mistake is made in the separation.

In general, the MLCS may keep the Y(X) part of the one-time benchmark data (X, Y(X)) secret. However, in certain situations (e.g., dispute, legal proof, court order, etc.) the MLCS may be required to publish its benchmark data to prove that the data was suitable for benchmarking a given ML model and Y(X) is a indeed a correct output for X. Due to the one-time use of any (X, Y(X)) data sample, the benchmark data may become public without weakening the already issued MLCS certificates. Additionally, the MLCS may even voluntarily publish samples from its benchmark data to increase trust towards the MLCS.

The use of the MLCS also provides benefits for the MLP. The MLCS not only proves to the MLC that its data was processed by an ML model previously benchmarked to provide the agreed accuracy, but at the same time it also provides proof to the MLP if an MLC debates this fact. In an extreme case, an MLC's data may be semantically unfit for the ML model for which the data was submitted for processing, therefore resulting in poor accuracy on the MLC's data. Yet providing good accuracy on the one-time benchmark data of MLCS proves that the agreed ML model was used, countering the false claims of MLC for any refund or other recourse. That is, the MLCS is an unbiased source of truth regarding the fact whether the input data was processed by a pre-agreed ML model. Note that, because the MLCS (and none of the other entities) has actual access to the ML model, technically the MLCS proves that the MLC's data was processed by an equivalent of the previously benchmarked ML model.

In reality, it could be a slightly improved (e.g., re-trained, updated, etc.) version of the ML model. Still, as what matters is the quality of the model's output, this proof is sufficient in practice.

As previously discussed, the MLCS implements the generation of one-time use benchmark data to be used with a specific ML model. The MLCS may generate one-time benchmark data samples using simulations driven by a high entropy random source. Different types of simulations are needed for different ML tasks. For example, for image recognition, image rendering is needed; for speech to text transcription, speech generation is needed; for network state modelling, network data generation is needed; etc. For image recognition, a set of known images may be used. One of the images is selected randomly and then may be randomly modified in some way. For example, the image may be stretched, rotated, or translated. The colors in the image may be changed. With a large set of images to choose from and the application of various random image effects, a large number unique image samples may be generated. In another approach, images may be combined or composite images may be made from a plurality of other images. For audio transcription, a machine learning model may be produced that is able to take input text and generate an audio clip. The voice of the output audio may also be randomly selected. The input data could be other types of data including numerical data.

The MLCS may also use ML itself for the generation of data. In one embodiment, the MLC may share its own data samples (or part of it) with the MLCS when asking for one-time benchmark samples. The MLC's own data samples may serve as a clue to the MLCS about exactly what kind of data the MLC will use. The MLCS may use generative ML models seeded by the MLC's own data to produce further data that resembles the MLC's data, but for which data the MLCS knows the expected output from the MLP.

For example, for images, neural style transfer may be used to produce images with a pre-defined content (e.g., known location of objects) but in the style of the images provided by the MLC. Such style transfer allows the one-time benchmark samples generated by the MLCS to blend in with the MLC's own data even more. Similar and other techniques may be used to generate benchmark samples.

Mixing the one-time benchmark samples with the input data from the MLC helps to thwart a malicious MLP as described above. The MLC may mix the one-time benchmark samples obtained from the MLCS on different levels. The most trivial (and often sufficient) mixture is to simply concatenate the its own samples after the benchmark samples and then randomly shuffling the ordering of the samples (whenever the order of samples does not matter for the analysis). A deeper mixture is also possible, by merging a benchmark sample and one of its own samples together into a single sample. For example, for images, a benchmark image and one of the MLC's own imaged may be copied side-by-side to make a larger image and then that larger image is used as a sample submitted to the MLP. This makes it even more complex for the MLP to try to split the data into benchmark and original parts and improves the likelihood that the MLP runs the same model on all data. Also, audio or text inputs may easily be combined to produce longer audio or text inputs, that would still produce the correct output for each input part.

A certificate generated by the MLCS may at least contain the identity of the MLP, the identity of the MLP's ML model that is certified, and the certified model accuracy. Additionally, the certificate may contain statistics or further information on the data that was used for the benchmarking. Ultimately, samples from the benchmark data may also be published or linked to the certificate.

A strength of the MLCS method is that it does not require any change on the MLP's interface/API (neither when interacting with the MLCS nor with the MLC). Any currently available MLP may be certified as-is, and MLCs may use the MLCS to obtain proof of the accuracy of the MLP's model processing their own data. The benefit for the MLP is also realized without any change to the MLP.

The new interface between the MLCS and the MLC would benefit from a level of standardization. This impacts the following interactions according to FIG. 4.

For the MLC→MLCS interface: request for one-time benchmark samples. This request should include the identity of the MLP and the identity of the ML model of the MLP. In practice, this could be an URI pointing to the REST API resource where the MLP offers the service corresponding to a given model (including the accuracy of the model). Additionally, the MLC may provide further clues about the kind of data it will send to the MLP, so that the MLCS can generate one-time benchmark samples that are very similar to the MLC's own data. For example, if the ML task is image analytics, the MLP may describe the resolution and quality of its own images to the MLCS, and the MLCS may initialize its random image generator so that it will create images of the same resolution and quality.

For the MLCS→MLC interface: provide one-time benchmark samples. This response may carry a container with the data that can be mixed by the MLC with its own data.

For the MLC→MLCS interface: the response obtained from the MLP on the one-time benchmark data. This notification should contain only what the MLP has returned for the one-time benchmark data, and not the response for the MLC's own data. The MLC has to demultiplex the response of the MLP by reversing the mixing process it has done earlier.

For the MLCS→MLC interface: verification of the accuracy of the MLP model. This response is essentially an acknowledgement or negative acknowledgement indicating whether the accuracy of the MLP's model was found to match the same model's previous benchmark accuracy. The response may also contain the quantified accuracy for this particular model run, and the previously certificated accuracy.

Figure 5:
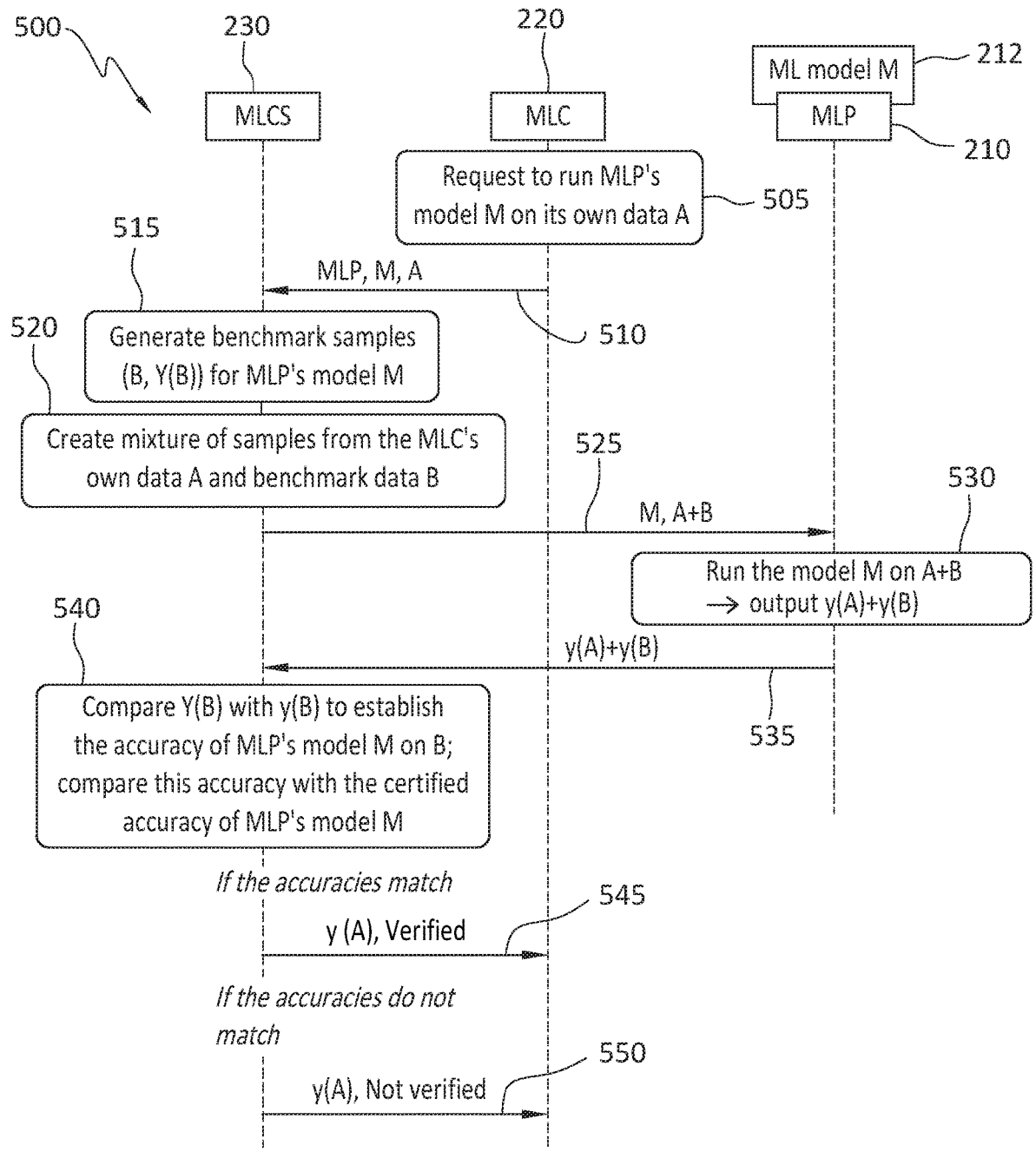
FIG. 5 illustrates another method of verifying that data samples from a MLC were accurately processed.

An alternative implementation will now be described where the MLCS 230 is a data and service proxy for MLC 220 towards the MLP 210. FIG. 5 illustrates another method of verifying that data samples from a MLC 220 were accurately processed. As an additional service, the MLCS 230 may implement a data and service proxy functionality for the MLC 220. In this setup, the MLC 220 does not interact with the MLP 210 directly but only with the MLCS 230. The MLC 220 generates a request to run a ML model M on its own data A 505. The MLC 220 sends the request with own data A to the MLCS 230, naming the MLP 210 and the ML model/service 212 by which the data needs to be processed 510. The MLCS 230 generates one-time benchmark data samples B 515 and performs the mixing of the MLC's data A with the one-time benchmark data B 520. The MLCS 230 sends the mixture of the data and identified ML model M to the MLP 210 using its own subscription to the MLP APIs (which is needed anyway for the MLCS to perform the certification of the ML model) 525. The MLP 210 processes the mixed data using ML model M 212 to produce the output y(A)+y(B) 530. The MLP 210 returns the output y(A)+y(B) 535 to the MLCS 230. The MLCS 230 extracts the MLP's response corresponding to the one-time benchmark data and verifies the accuracy of the MLP model 540 by comparing the secret results produced by the MLCS 230 with the results from the ML model M. Finally, the MLCS 230 returns the MLP's response corresponding to the MLC's own data along with the accuracy verification result to the MLC 545, 550.

This alternative approach has multiple benefits for the MLC 220. The MLC 220 does not need to deal with the complexity of mixing the one-time benchmark samples with its own data—this would be provided by the MLCS 230 as a service to the MLC 220. As a side effect, the MLCS 230 may take advantage of the insight to the full MLC input data to generate compelling one-time benchmark samples resembling the MLC data. The MLC 220 does not need to maintain a subscription to the MLP 210, which may have its own cost. The MLC 220 is not charged directly by the MLP 210 for the cost of the additional one-time benchmark samples. The MLCS 230 pays for using the MLP's service for both the MLC data and the one-time benchmark samples. Because the MLCS 230 may have a bulk institutional subscription with better a price negotiation position, the per-sample cost may be lower if all samples are submitted by the MLCS 230. The cost of the MLP 210 service may be shared back to the MLC 220 by the MLCS 230 as well as the additional cost of the MLCS's own services (data mixture, accuracy verification, etc.).

This alternative approach requires that the MLC 220 trusts the MLCS 230 with its own data. This is the choice of the MLC 220, and it is a non-technical decision. However, note that the MLC 220 already trusts the MLP 210 with its data, therefore the quantum leap of providing data to external entities has already been made by the MLC 220 when it started to use MLP 210.

This system may be implemented in multiple architectures. The main question is the placement of the MLCS function, and to a smaller extent the MLCs eligible for the service of the MLCS. In general, the MLCS may be implemented as a public cloud service, accessible to any entity (as MLC) that registers and complies with the terms of usage of the MLCS.

The MLCS may be used as part of a framework using ML models for lawful interception or smart city use cases (such as video analytics), where the accuracy of the used ML models needs to be established and provable. For example, when a video camera records an incident such as crime or an accident, the MLC may use the MLCS to analyze that captured video to either identify the event or to extract information regarding the event from the video. Such data then may become part of a criminal prosecution or a civil litigation. Accordingly, the accuracy of the ML model used on the collected video data and its outputs need to be verified. The MLCS helps to verify the output and to provide a level of accuracy to help in the criminal prosecution or civil litigation.

Figure 6:
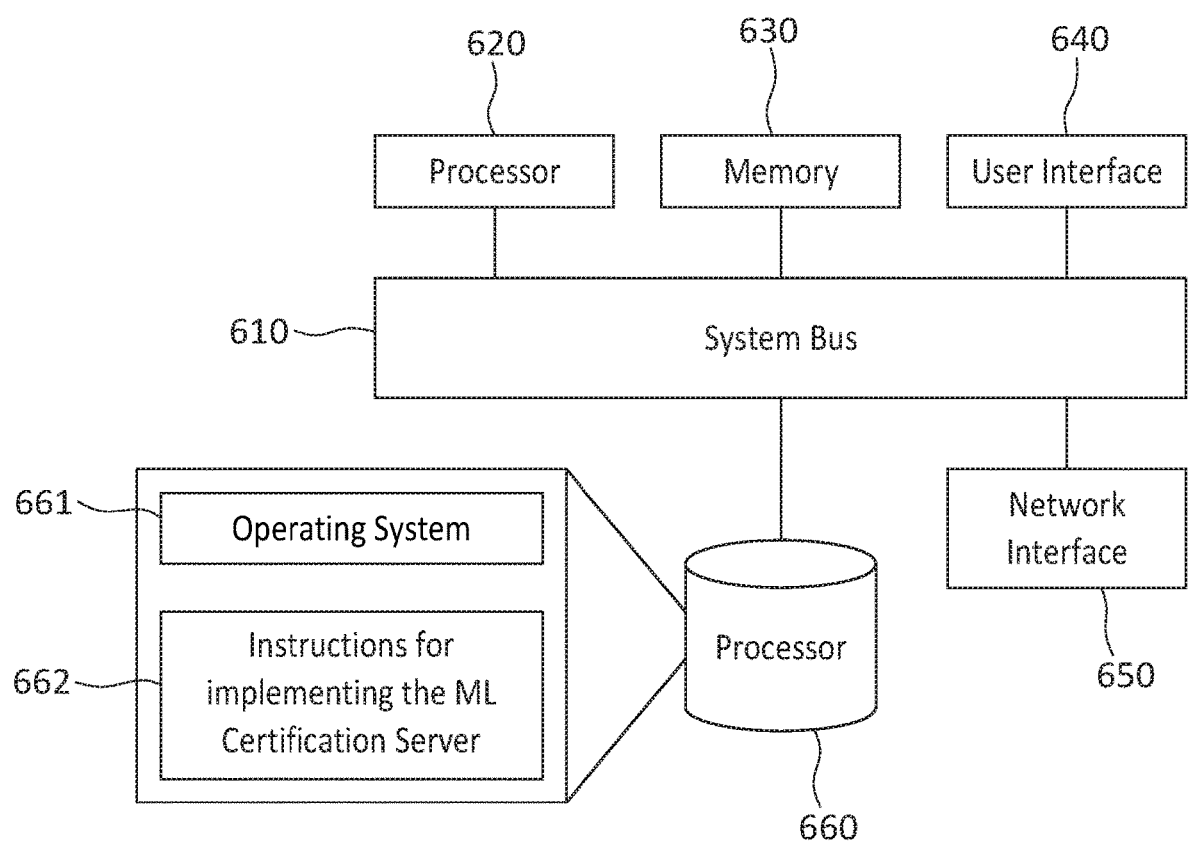
FIG. 6 illustrates an exemplary hardware diagram of the MLCS 230. Additionally, the exemplary hardware diagram may be used to implement the MLC or the MLP.

FIG. 6 illustrates an exemplary hardware diagram of the MLCS 230. Additionally, the exemplary hardware diagram may be used to implement the MLC or the MLP. It will be understood that FIG. 6 constitutes, in some respects, an abstraction and that the actual organization of the components of the device 600 may be more complex than illustrated.

The processor 620 may be any hardware processing device capable of executing instructions stored in memory 630 or storage 660 or otherwise processing data. As such, the processor may include a microprocessor, a graphics processing unit (GPU), field programmable gate array (FPGA), application-specific integrated circuit (ASIC), any processor capable of parallel computing, or other similar devices.

The memory 630 may include various memories such as, for example L1, L2, or L3 cache or system memory. As such, the memory 630 may include static random-access memory (SRAM), dynamic RAM (DRAM), flash memory, read only memory (ROM), or other similar memory devices.

The user interface 640 may include one or more devices for enabling communication with a user and may present information to users. For example, the user interface 640 may include a display, a touch interface, a mouse, and/or a keyboard for receiving user commands. In some embodiments, the user interface 640 may include a command line interface or graphical user interface that may be presented to a remote terminal via the network interface 650.

The network interface 650 may include one or more devices for enabling communication with other hardware devices. For example, the network interface 650 may include a network interface card (NIC) configured to communicate according to the Ethernet protocol or other communications protocols, including wireless protocols. Additionally, the network interface 650 may implement a TCP/IP stack for communication according to the TCP/IP protocols. Various alternative or additional hardware or configurations for the network interface 650 will be apparent.

The storage 660 may include one or more machine-readable storage media such as read-only memory (ROM), random-access memory (RAM), magnetic disk storage media, optical storage media, flash-memory devices, or similar storage media. In various embodiments, the storage 660 may store instructions for execution by the processor 620 or data upon which the processor 620 may operate. For example, the storage 660 may store a base operating system 661 for controlling various basic operations of the hardware 600. The storage 662 may store instructions for implementing the MLCS.

It will be apparent that various information described as stored in the storage 660 may be additionally or alternatively stored in the memory 630. In this respect, the memory 630 may also be considered to constitute a "storage device" and the storage 660 may be considered a "memory." Various other arrangements will be apparent. Further, the memory 630 and storage 660 may both be considered to be "non-transitory machine-readable media." As used herein, the term "non-transitory" will be understood to exclude transitory signals but to include all forms of storage, including both volatile and non-volatile memories.

While the system 600 is shown as including one of each described component, the various components may be duplicated in various embodiments. For example, the processor 620 may include multiple microprocessors that are configured to independently execute the methods described herein or are configured to perform steps or subroutines of the methods described herein such that the multiple processors cooperate to achieve the functionality described herein. Such plurality of processors may be of the same or different types. Further, where the device 600 is implemented in a cloud computing system, the various hardware components may belong to separate physical systems. For example, the processor 620 may include a first processor in a first server and a second processor in a second server.

The MLCS described herein solve the technological problem of ensuring that results obtained from an MLP based upon data submitted to the MLP is accurate. The MLCS runs its own benchmark data through the target ML models to calculate the accuracy of the target ML models. Then the MLCS generates further benchmark data to be included with data from a MLC to be processed by the ML model. The outputs of the ML model may then be used by the MLCS to verify that the ML model used meets the previously obtained accuracy. Thus the model output is verified.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention.

Accordingly, the foregoing disclosure, description, and figures are for illustrative purposes only and do not in any way limit the invention, which is defined only by the claims.

What is claimed is:

1. A method for verifying the results from a machine learning (ML) model hosted by a machine learning as a service (MLaaS) for a MLaaS consumer (MLC), comprising:
   receiving a request for benchmark samples from a MLC for the ML model;
   generating one-time use benchmark samples and benchmark outputs for the ML model;
   transmitting the benchmark samples to the MLC;
   receiving from the MLC outputs from the ML model on the benchmark samples;
   comparing the MLC outputs on the benchmark samples with the generated benchmark outputs to verify the ML model outputs; and
   sending a verification message to the MLC based on verification.

2. The method of claim 1, wherein generating benchmark samples and outputs for the ML model includes using a simulation driven by a random source.

3. The method of claim 2, wherein the simulation is a machine learning based simulation.

4. The method of claim 1, wherein
   receiving a request for benchmark samples from a MLC for the ML model includes receiving MLC inputs to the ML model, and
   generating benchmark samples and outputs for the ML model includes using a simulation and the MLC inputs to the ML model.

5. The method of claim 1, further comprising publishing the generated benchmark samples and the outputs from the ML model on the benchmark samples.

6. A method for verifying the results from a machine learning (ML) model hosted by a machine learning as a service (MLaaS) using a ML certification server (MLCS), comprising:
   sending a request for one-time use benchmark samples from the MLCS for the ML model;
   receiving the benchmark samples from the MLCS;
   mixing input data for the ML model with the received benchmark samples;
   sending the mixed input data and received benchmark samples to the ML model;
   receiving the outputs from the ML model in response to the mixed input data and received benchmark samples;
   requesting verification from the MLCS of the outputs of the ML model based upon the benchmark samples; and
   receiving verification of the ML outputs from the MLCS.

7. The method of claim 6, wherein mixing input data for the ML model with the received benchmark samples includes concatenating the input data for the ML model with the received benchmark samples and then randomly shuffling the order of the concatenated inputs.

8. The method of claim 6, wherein mixing input data for the ML model with the received benchmark samples includes combining each of the input data for the ML model with different receive benchmark samples.

9. The method of claim 8, wherein the input samples are one of images, audio data, text data, and numerical data.

10. The method of claim 6, further comprising separating the outputs for the ML based upon the benchmark samples form the outputs of the ML model based upon the input data.

11. A method for verifying the results from a machine learning (ML) model hosted by a machine learning as a service (MLaaS) for a MLaaS consumer (MLC), comprising:
    receiving a request from a MLC to run input data from the MLC on the ML model;
    generating one-time use benchmark samples and benchmark outputs for the ML model;
    mixing the received input data with the generated benchmark samples;
    sending the mixed input data and benchmark samples to the ML model;
    receiving the outputs from the ML model in response to the mixed input data and benchmark samples;
    comparing the MLC outputs on the benchmark samples with the generated benchmark outputs to verify the ML model outputs; and
    sending a verification message to the MLC based on verification.

12. The method of claim 11, wherein generating benchmark samples and outputs for the ML model includes using a simulation driven by a random source.

13. The method of claim 12, wherein the simulation is a machine learning based simulation.

14. The method of claim 11, wherein generating benchmark samples and outputs for the ML model includes using a simulation and the input data to the ML model.

15. The method of claim 11, further comprising publishing the generated benchmark samples and the outputs from the ML model on the benchmark samples.

16. The method of claim 11, wherein mixing the received input data with the generated benchmark samples includes concatenating the received input data with the generated benchmark samples and then randomly shuffling the order of the concatenated inputs.

17. The method of claim 11, wherein mixing the received input data with the generated benchmark samples includes combining each of the received input data with different receive benchmark samples.

18. The method of claim 17, wherein the input samples are one of images, audio data, text data, and numerical data.

19. The method of claim 11, wherein further comprising separating the outputs for the ML based upon the benchmark samples form the outputs of the ML model based upon the input data.

* * * * *